Aug. 11, 1931.  W. W. SLOANE  1,817,947
CONTROLLER
Filed Feb. 14, 1927  4 Sheets-Sheet 1

Inventor
William W. Sloane
by Clarence F. Poole
Attorney

Aug. 11, 1931.　　　W. W. SLOANE　　　1,817,947
CONTROLLER
Filed Feb. 14, 1927　　　4 Sheets-Sheet 2

Inventor
William W. Sloane
by Clarence F. Poole
Attorney

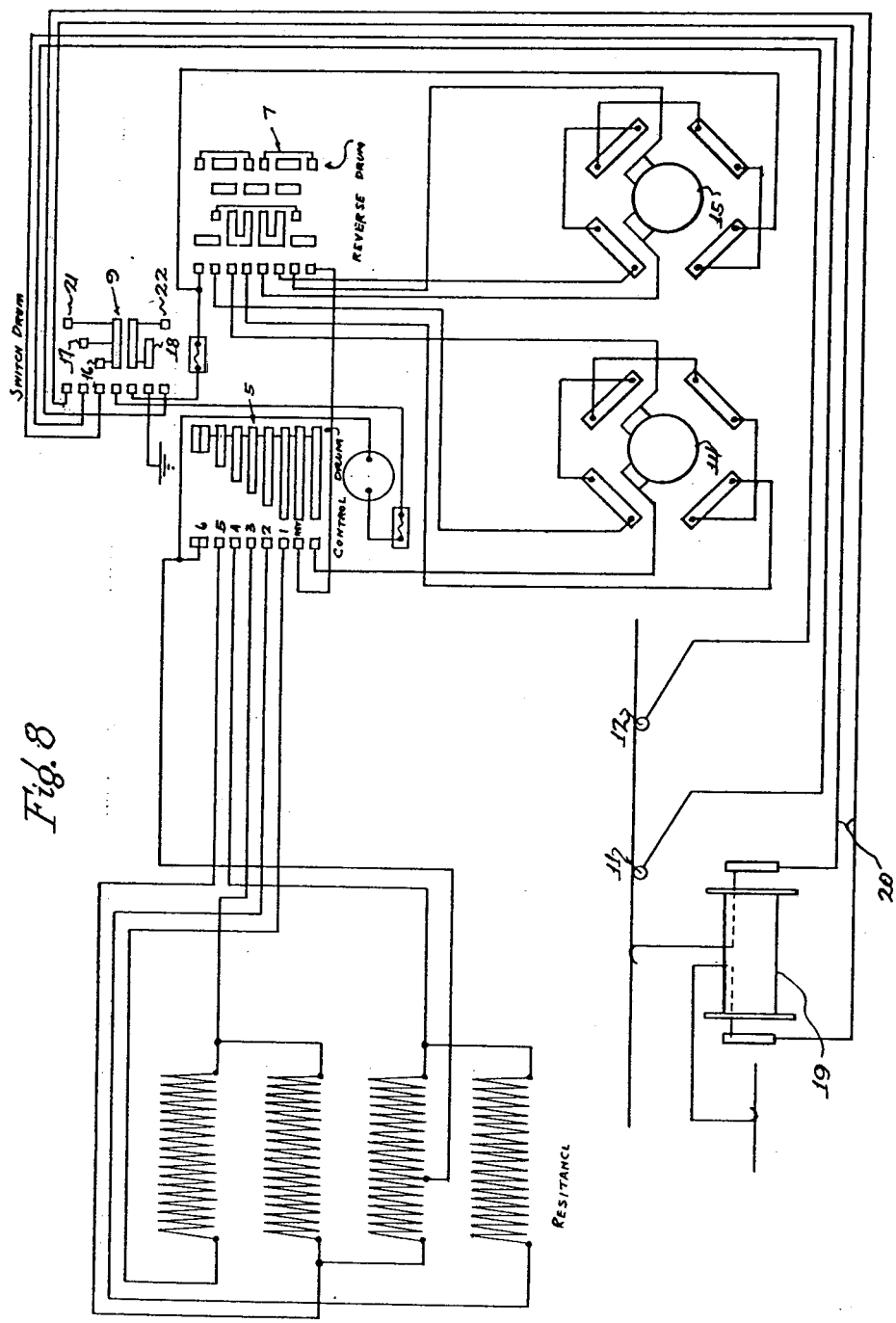

Patented Aug. 11, 1931

1,817,947

UNITED STATES PATENT OFFICE

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS

CONTROLLER

Application filed February 14, 1927. Serial No. 167,928.

This invention relates to improvements in controllers for electric railway systems and has for its principal object to provide an explosion proof controller for gathering locomotives of the explosion proof reel and trolley type having a plurality of contact drums, each enclosed in an individual compartment with a new and novel means for mechanically interlocking said control drums.

This invention may best be understood by reference to the accompanying drawings, wherein:

Figure 8 is a diagrammatic view, showing the various parts of a controller, together with circuits connecting the contacts of the controller with the resistance, motor, trolley, reel and feed wires.

Figure 1:
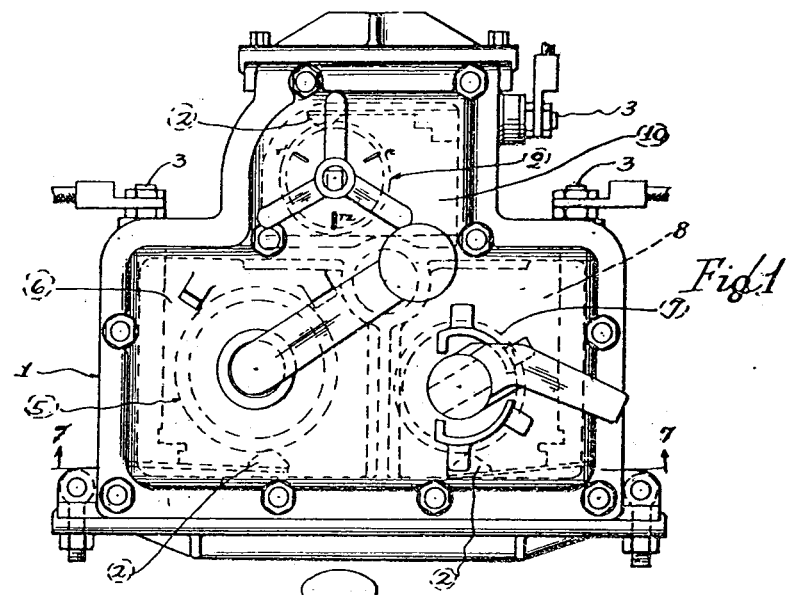
Figure 1 is a top plan view of a controller embodying the device in my invention.
Figure 2:
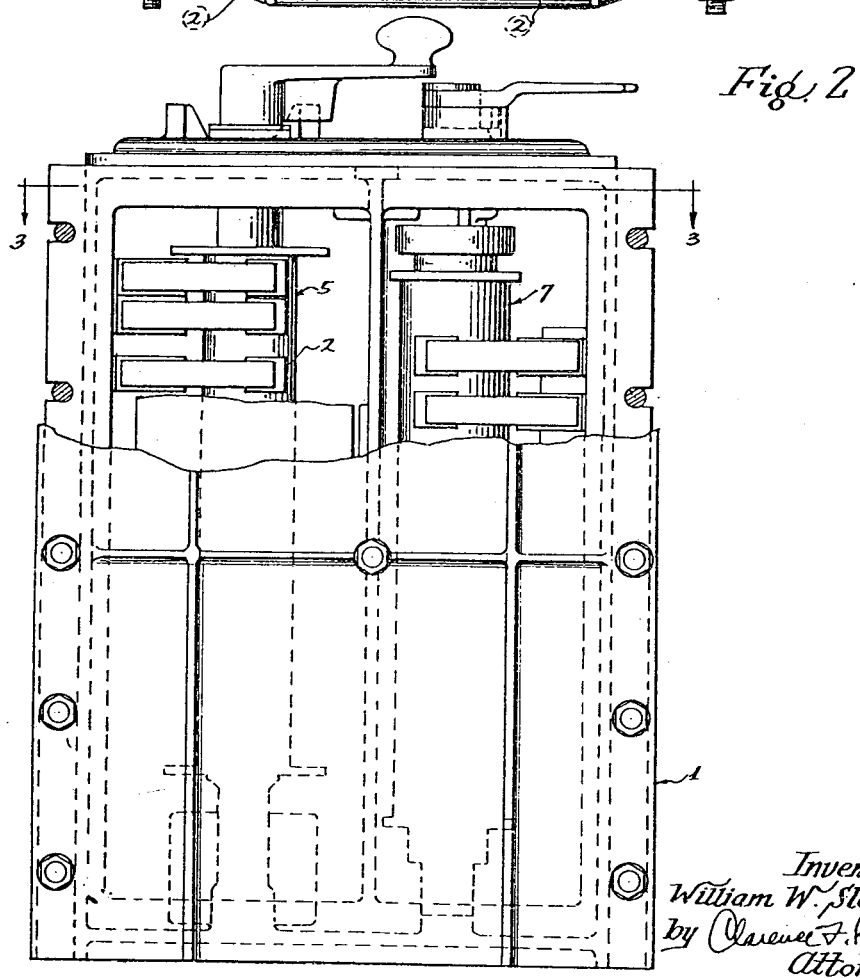
Figure 2 is a front end view of the device shown in Figure 1.
Figure 5:
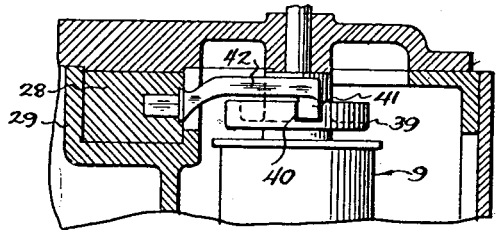
Figure 5 is a fragmentary sectional view of the top portion of another of the contact drums taken on line 5—5 of Figure 3.

As will hereinafter appear, the general type and form of control is of that shown and described in the prior Patents Nos. 1,425,375 and 1,558,421, issued to Sidney W. Farnham, wherein a double conductor cable is used on the gathering reel and the locomotive motors are disconnected from ground while operating on said double conductor cable. As was therein described, it was seen that the function of using a double conductor cable and disconnecting the motors from the ground was to prevent sparking between the locomotive wheels and rail to prevent gas or dust explosions and to make it unnecessary to bound the rails beyond the trolley line.

The embodiment of my invention herein described comprises a controller 1 for starting the motors, reversing said motors and connecting them either to the cable reel or to the trolley. Three contact drums or cylinders are provided for this purpose, each drum is enclosed in a separate chamber and all three drums are mechanically interlocked, to prevent injury to the contacts or motors. Suitable contact fingers 2 are provided to make contact with the contacts on said contact drums to connect said drums with the outside source of power and transmit said power to the motors for actuating the locomotive. It may be here noted that all connections to said contact fingers 2 are made from the outside of the controller casing through studs 3 suitably insulated from said controller casing. The purpose in having said connections on the outside of the controller casing is to eliminate all wiring inside of said casing and to eliminate the sealing of said wires as is necessary in explosion proof equipment where wires enter into the controller. The aforementioned contact drums comprise a control drum 5 in an enclosed chamber 6, for starting the locomotive by cutting out the resistance in the ordinary manner, a drum 7 in an enclosed chamber 8, for reversing the direction of rotation of the locomotive motors and operating said motors in series or parallel, and a third auxiliary drum 9 in an enclosed chamber 10 to connect the motor circuit either to the trolley or cable reel, disconnecting the motors from ground while operating on said cable reel. It may here be mentioned that the third drum may also be used as a braking drum in cases where dynamic braking is used on the locomotive.

In viewing the diagram of the wiring (Figure 8) it may be seen that two trolleys 11 and 12 are provided and that either trolley may be used to transmit current to motors 14 and 15 and that said current passes through contacts 16 and 17 on the drum 9 returning to the rail or ground through a contact 18 on said drum. A cable reel 19 is also provided having a double conductor cable 20 thereon for operating the locomotive beyond the trolley line. One conductor of said cable is hooked to the trolley line while the other conductor is hooked to the rail to supply electric power to the motors 14 and 15. This cable connects the locomotive in the circuit through contacts 21 and 22 on the drum 9. Here it may be seen that when the contacts 21 and 22 are in contact position, and current is provided through the cable reel 19, that the contacts 16, 17 and 18 are out of contact with the drum 9 and the trolley wire and ground from the motors is disconnected from the motor circuit.

The drums 5, 7 and 9 are arranged so that neither of the drums 7 or 9 can be turned to reverse the current through the motor or switch the current from trolley to reel while the drum 5 is in a position to connect the motor in circuit so that before either of the drums 7 or 9 can be turned, the drum 5 must be brought back to the initial position, and also the drums 7 and 9 must both be in a contact position before the drum 5 can be moved to a starting position. The means for interlocking said drums herein shown is new and novel in that said drums are mechanically interlocked and each drum is in a separately enclosed chamber and said locking means is so arranged that a flame will not pass from one chamber to another, through said locking device. In the construction herein shown the drum 5 is provided with an index or star wheel 25 having a slight depression for each point of contact on the controller drum, and a deeper depression for the extreme off position of said drum. A roller 26 on an arm 27 rides on the outer periphery of said star wheel. The arm 27 is fixed in a circular disc 28 which fits in a recess 29 at the junction point of the chambers 6, 8 and 10, and has rotatable movement therein. The reverse drum 7 is similarly provided with an index 30 at its lower extremity and a locking disc 31 at its upper extremity. Said locking disc has an upwardly projecting outer rib 32 with four notches 33 therein. Said notches correspond to each contact position of the reverse drum 7. An arm 35 is held in the disc 28 and has a depending lug 36 at its outer extremity bearing against the inner side of the rib 32 and engageable with the notches 33. A spring 37 is interposed between the outer end of the arm 35 and the inner portion of the chamber 8 to disengage the lug 36 from the notches 33 except when engaged in said notches by means of the arm 27 which actuates the arm 35 through the star wheel 25 and the disc 28. Said spring also forces the roller 26 against the outer periphery of the star wheel 25.

Figure 3:
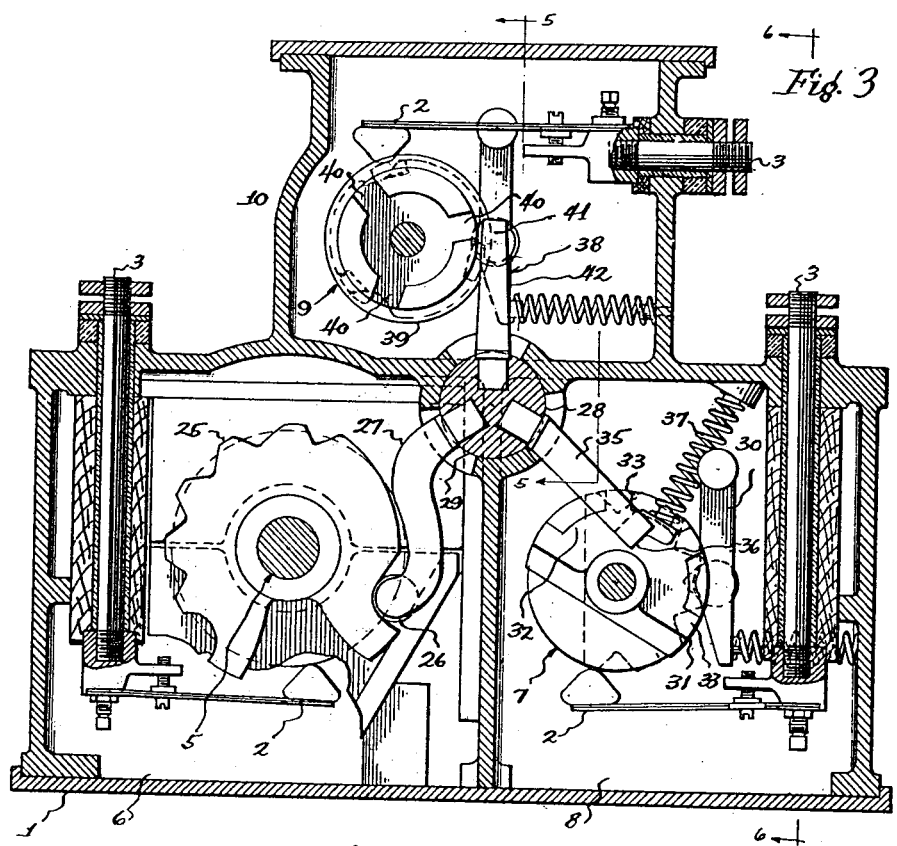
Figure 3 is a sectional view taken on line 3—3 of Figure 2.
Figure 4:
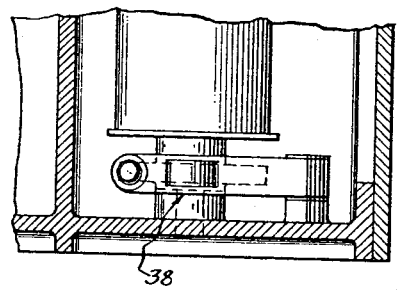
Figure 4 is a detail partial enlarged fragmentary sectional view of the bottom portion of one of the contact drums.
Figure 7:
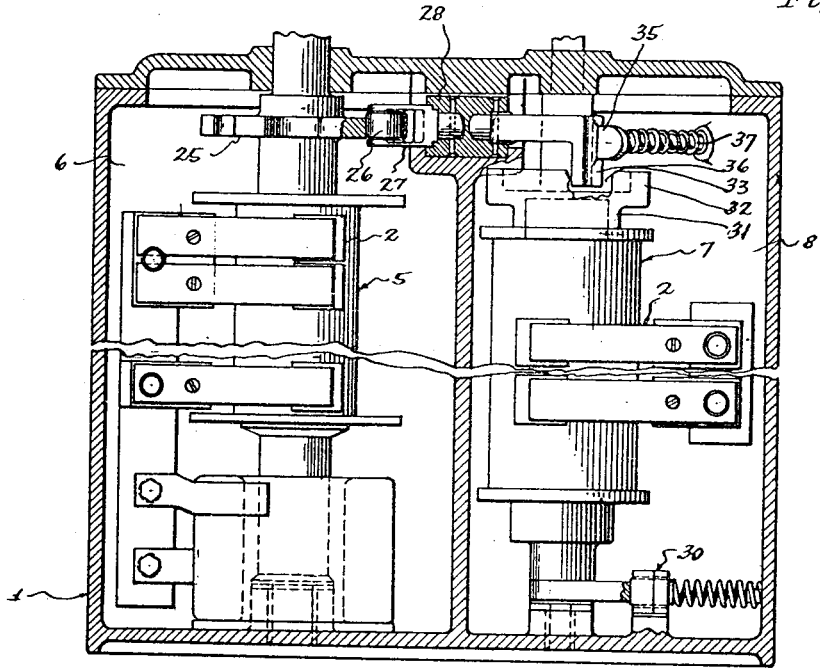
Figure 7 is a fragmentary sectional view taken on line 7—7 of Figure 1.
Figure 6:
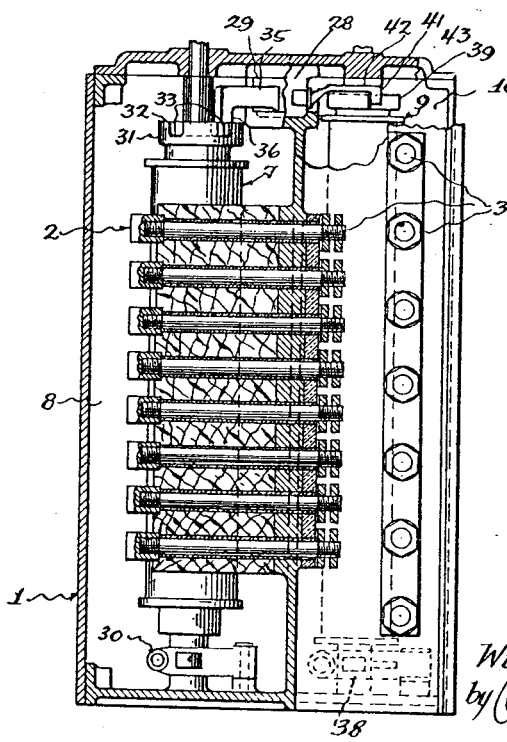
Figure 6 is a sectional view taken on line 6—6 of Figure 3.

The drum 9 is also provided with an index 38 near its base and a locking disc 39 near its upper portion. Said disc has notches 40 therein corresponding to the contact position of said drum and is adapted to receive a depending lug 41 on the end of a lever 42 which is fixed in the circular disc 28 and bears against the outer side of the locking disc 39. It may therefore be seen that the lever arms 27, 35 and 42 operate together on a common pivotal point which is the vertical center of the disc 28 and when the roller 26 is in the position shown in Figure 3, which is the off position of the drum 5, the drums 7 or 9 may be moved, and when the drum 5 is rotated from this position, the levers 35 and 42 are moved so that depending lugs 36 and 41 engage the notches 33 and 40 respectively preventing movement of the drums 7 and 9. Also when the drum 5 is in an off position and either of the drums 7 or 9 are not in a contact position, the lever for the drum out of contact position bearing against the respective interlocking disc will prevent movement of the arm 27 and thus prevent movement of the star wheel 25 and drum 5.

In explosion proof equipment approved by the United States Bureau of Mines it is required that all joined surfaces be accurately machined and fitted with no defects such as blow holes or rough spots therein, and that said joints should be at least one and one-half inches wide with no gaskets between the surfaces of the joints. The object is not to prevent gas from entering the enclosure but to cool any gaseous flame inside of said enclosure so as to extinguish the flame before it reaches the outside of the enclosure. In the case of a controller provided with more than one drum, as in the controller herein described, it is desirable that each drum be enclosed in a separate chamber and that the same standards in joints between chambers be adhered to as is required of outside joints.

In the invention herein described, it is seen that the joint between the chambers is that caused by the interlocking means interposed between the drums 5, 7 and 9. In looking at Figure 3, it may be seen that the surfaces between each chamber are ample to cool the flame of an explosion in one chamber, so said flame will not ignite any gas which might be in another chamber. It may also be seen that while these explosion proof surfaces are of sufficient area to adhere to the standards of explosion proof equipment, the openings to each chamber are of ample proportions to allow for the movement of each arm for interlocking the drums together.

Although I have shown and described one embodiment of my invention, it will be understood that the construction and arrangement of the various parts may be altered or changed without departing from the spirit and scope thereof. Furthermore, I do not wish to be construed as limiting myself to the particular form illustrated, excepting as it may be limited in the appended claims.

I claim as my invention:

1. In combination with an explosion proof electric locomotive controller, a plurality of contact drums, each being completely enclosed, one of said drums controlling a resistance, another of said drums controlling a reversing means for said locomotive, a third drum affording means for selectively connecting the locomotive circuit to one or another source of current supply, and an explosion proof interlocking connection between said drums to prevent movement of said reversing and switching drum while said resistance drum is in a position to close the circuit.

2. In combination with an explosion proof electric locomotive controller, a plurality of contact drums, each being completely enclosed, one of said drums controlling a resistance, another of said drums controlling a reversing means for said locomotive, a third drum affording means for selectively connecting the locomotive circuit to one or another source of current supply, and a mechanical explosion proof interlocking connection between said drums to prevent movement of said reversing and switching drum while said resistance drum is in a position to close the circuit.

3. In combination with an explosion proof electric locomotive controller, a plurality of contact drums, one of said drums controlling a resistance, another of said drums controlling a reversing means for said locomotive, a third drum affording means for selectively connecting the locomotive circuit to one or another source of current supply, and a mechanical explosion proof interlocking connection between said drums providing a means for mechanically interlocking each drum with said resistance controlling drum and maintaining an enclosed explosion proof chamber for each drum.

4. In combination with an explosion proof electric locomotive controller, a plurality of contact drums, one of said drums controlling a resistance, another of said drums controlling a reversing means for said locomotive, a third drum affording means for selectively connecting the locomotive circuit to one or another source of current supply, and a mechanical explosion proof interlocking connection between said drums providing a means for mechanically interlocking each drum with said resistance controlling drum and maintaining an enclosed explosion proof chamber for each drum, comprising a member having a main body portion thereof received in a suitable receiving means at the inner junction point of said contact drum chambers, and a plurality of arms projecting outwardly from said body portion having interlocking engagement with said contact drums.

5. In combination with an explosion proof electric locomotive controller, a plurality of contact drums, one of said drums controlling a resistance, another of said drums controlling a reversing means for said locomotive, a third drum affording means for selectively connecting the locomotive circuit to one or another source of current supply, and a mechanical explosion proof interlocking connection between said drums providing a means for mechanically interlocking each drum with said resistance controlling drum and maintaining an enclosed explosion proof chamber for each drum, comprising a member having a main body portion thereof secured in a suitable receiving means at the inner junction point of said contact drum chambers, and a plurality of arms projecting outwardly from said body portion comprising an arm having a roller on its outer portion for riding on a cam device on the resistance controlling drum, an arm adaptable to engage suitable notches on the reversing drum, a spring interposed between said arm and an inner wall of said reversing drum chamber, and another arm adaptable to engage suitable notches on said switching drum.

6. In combination with an explosion proof electric locomotive controller, a plurality of contact drums, each drum being in a separately enclosed chamber, a socket at the junction point of said chambers having an opening to each chamber, and a wall portion of sufficient length and depth to form an explosion proof surface when a suitable member is inserted therein.

7. In combination with an explosion proof electric locomotive controller, a plurality of contact drums, each drum being in a separately enclosed chamber, a socket at the junction point of said chambers having an opening to each chamber, and a member rotatable therein and forming an explosion proof surface between said chambers, a central portion of said member forming a pivotal point for an interlocking connection between said contact drums.

8. In combination with an explosion proof electric locomotive controller, a plurality of contact drums, each drum being in a separately enclosed chamber, a socket at the junction point of said chambers, an interlocking member rotatable therein, openings in said socket to each contact drum chamber, arms projecting from and forming a part of said interlocking member and movable in said openings, said openings being of sufficient length to permit movement of said arms for interlocking said contact drums and leaving sufficient surface in said socket to maintain an explosion proof surface between each member.

9. In combination with an electric locomotive controller, a plurality of contact drums, one of said drums controlling a resistance, another of said drums controlling a reversing means for said locomotive, a third drum affording means for selectively connecting the locomotive circuit to one or another source of current supply, and a common mechanically operated interlocking device having locking engagement with each of said drums and forming an interlocking connection between said drums to prevent movement of any two of said drums while any third drum is being moved.

10. In combination with an electric locomotive controller, a plurality of contact drums, one of said drums controlling a resistance, another of said drums controlling a reversing means for said locomotive, a third drum affording means for selectively connecting the locomotive circuit to one or another source of current supply, and a common mechanical interlocking device pivoted at a point intermediate said drums forming an interlocking connection between said drums to prevent movement of any two of said drums while any third drum is being moved.

11. In combination with an electric locomotive controller, a plurality of contact drums, one of said drums controlling a resistance, another of said drums controlling a reversing means, a third drum affording means for selectively connecting the locomotive circuit to one or another source of current supply, and a common interlocking device having a separate arm engageable with each of said drums, and forming an interlocking connection between said drums to prevent movement of any two of said drums while any third drum is being moved.

12. In combination with an electric locomotive controller, a plurality of contact drums, one of said drums controlling a resistance, another of said drums controlling a reversing means, a third drum affording means for selectively connecting the locomotive circuit to one or another source of current supply, and a common interlocking device pivoted at a point intermediate said drums and having a separate arm engageable with each of said drums forming an interlocking connection between said drums to prevent movement of any two of said drums while any third drum is being moved.

13. In combination with an electric locomotive controller, a plurality of contact drums, one of said drums controlling a resistance, another of said drums controlling a reversing means, a third drum affording means for selectively connecting the locomotive circuit to one or another source of current supply, and a common interlocking device pivoted at a point intermediate said drums having a plurality of locking arms projecting radially outward therefrom, each of said arms being engageable with one of said drums and forming an interlocking connection between said drums to prevent movement of any two of said drums while any third drum is being moved.

14. In combination with an electric locomotive controller, a plurality of contact drums, each of said contact drums being rotatable about a different axis, one of said drums controlling a resistance, another of said drums controlling a reversing means, a third drum affording a means for selectively connecting the locomotive circuit to one or another source of current supply, and a common interlocking device pivoted at a point intermediate said drums having a plurality of locking arms projecting radially outward therefrom, each of said arms being engageable with one of said drums and forming an interlocking connection between said drums to prevent movement of any two of said drums while any third drum is being moved.

15. In combination with an electric controller, a main contact drum, a plurality of auxiliary contact drums, and a common mechanical interlocking device pivoted at a point intermediate, said drums forming an interlocking connection between said drums to prevent movement of any two of said drums while any third drum is being moved.

16. In combination with an electric controller, a main contact drum, a plurality of auxiliary contact drums, and a common interlocking device having a separate arm engageable with each of said drums, and forming an interlocking connection between said drums to prevent movement of any two of said drums while any third drum is being moved.

17. In combination with an electric controller, a main contact drum, a plurality of auxiliary contact drums, and a common interlocking device pivoted at a point intermediate said drums and having a separate arm engageable with each of said drums, and forming an interlocking connection between said drums to prevent movement of any two of said drums while any third drum is being moved.

18. In combination with an electric controller, a main contact drum, a plurality of auxiliary contact drums, and a common interlocking device pivoted at a point intermediate, said drums having a plurality of locking arms projecting radially outward therefrom, each of said arms being engageable with one of said drums and forming an interlocking connection between said drums to prevent movement of any two of said drums while any third drum is being moved.

19. In combination with an electric locomotive controller, a plurality of contact drums comprising a main contact drum, and a plurality of auxiliary contact drums rotatable about different axes, and a common interlocking device pivoted at a point intermediate said drums having a plurality of locking arms projecting radially outward therefrom, each of said arms being engageable with one of said drums and forming an interlocking connection between said drums to prevent movement of any two of said drums while any third drum is being moved.

Signed at Chicago, in the county of Cook and State of Illinois, this 12th day of February, A. D. 1927.

WILLIAM W. SLOANE.